Figure 1:
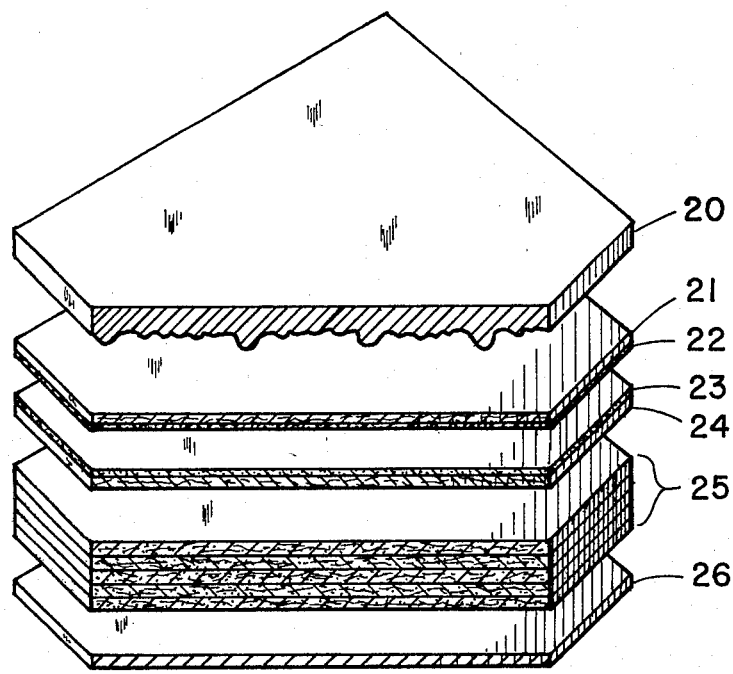

United States Patent [19]

West

[11] 4,376,812

[45] Mar. 15, 1983

[54] THREE COLOR HIGH PRESSURE DECORATIVE LAMINATE HAVING REGISTERED COLOR AND EMBOSSING

[75] Inventor: Wilbur W. West, Cincinnati, Ohio

[73] Assignee: Formica Corporation, Wayne, N.J.

[21] Appl. No.: 191,986

[22] Filed: Sep. 29, 1980

[51] Int. Cl.³ .................. B32B 3/30; B32B 31/20
[52] U.S. Cl. .................................. 428/165; 156/219; 156/220; 156/221; 156/222; 156/277; 264/132; 264/137; 428/172; 428/207; 428/211
[58] Field of Search ............ 428/172, 165, 207, 211; 156/219, 220, 221, 222, 209, 278, 277; 264/132, 137

[56] References Cited

U.S. PATENT DOCUMENTS 3,814,647 6/1974 Scher et al. ................. 156/219

FOREIGN PATENT DOCUMENTS 546143 12/1972 Switzerland.

Primary Examiner—Stanley S. Silverman
Attorney, Agent, or Firm—Frank M. Van Riet

[57] ABSTRACT

A decorative laminate having registered color and embossing is produced by effecting a simultaneous embossing and laminating using a three-dimensional press plate acting against a release sheet having a colored ink layer on the surface thereof adjacent the uppermost laminate surface and a color bearing sheet over which is coated, colored flowable resin.

8 Claims, 2 Drawing Figures

THREE COLOR HIGH PRESSURE DECORATIVE LAMINATE HAVING REGISTERED COLOR AND EMBOSSING

BACKGROUND OF THE INVENTION

For many years decorative laminates have been used as a surfacing material in residential and commercial structures wherein aesthetic effects, in combination with functional behavior such as wear, heat and stain resistance, are desired. Such decorative laminates generally are produced from a supporting base member such as a plurality of core sheets usually composed of kraft paper which has been impregnated with a thermosetting resin and, more particularly, with a thermosetting water-soluble or water-insoluble phenolic resin. When the kraft paper has been impregnated with the thermosetting resin, the sheets are dried and cut to the appropriate size. Thereupon, a plurality of these resin impregnated sheets are stacked in a superimposed relationship. The number of plies or sheets in the stack depend on the ultimate intended use of the laminate. For most purposes, the number of plies of these core sheets will total about six to nine but can total as many as 12-15.

There is then placed on the stack of core sheets a decorative sheet which is generally an opaque, pigmented sheet of alpha-cellulose paper and is impregnated with a noble thermosetting resin which is not subject to significant darkening upon the application of heat. Suitable resins for the decorative sheets are the aminotriazine resins and more particularly the melamine-formaldehyde resins, the benzoquanamine-formaldehyde resins, the unsaturated polyester resins and the like. Often the decorative sheet carries a printed pattern design on its surface. It is generally desirable when making printed pattern decorative laminates, to make use of a protective overlay sheet which is placed atop and is similar to the decorative sheet but is devoid of design and in the final laminate is transparent. The superimposed laminate components are then heat and pressure consolidated to a unitary structure. During the consolidation step, the thermosetting resins are converted to the thermoset state thereby providing an extremely hard, attractive and permanent laminated product. For obvious economic reasons, when producing the paper supported laminates, a plurality of these individual laminating assemblies are consolidated into one large assembly, each being separated from one another by a release sheet, and then to laminate this pack by heat and pressure application.

In consolidating the laminate components, an individual assembly is placed with its decorative overlayment surface adjacent to a highly polished stainless steel press plate. The plate provides a smooth, defect-free surface to one side of the laminate and also serves to separate pairs of back-to-back assemblies, thus permitting a plurality of these assemblies to be consolidated into laminates in one operation.

In the earliest days of the high pressure laminating art, the smooth, glossy surface produced during the pressing operation was sometimes, upon customer's request, reduced to a matte finish by rubbing the surface with pumice. Subsequently, a slightly textured surface was produced by pressing the laminate surface against an aluminum foil caul stock. Such a surface was described as mini-textured because the hilltop-to-valley bottom depth of such textures was from about 0.5 mil (0.0005 inches) to about 1.0 mil (0.001 inches). These mini-textured laminates met with immediate success and almost totally replaced the glossy surface market. Somewhat coarser textures or three dimensional surfaces, sometimes called "low-relief" laminates were then produced, e.g. by a printing process known as the "heavy ink" method, described in U.S. Pat. No. 3,373,068. These surfaces had hill-to-valley depths of about 3 to 5 mils.

Finally, very deep, three dimensional textured or embossed laminates were offered commercially. These laminates may be produced by e.g. the methods of U.S. Pat. No. 3,860,470, Jaisle etal., U.S. Pat. No. 3,718,496 Willard. Here the hill-to-valley depth in the surface is of the order of about 20 mils.

As demands for these new laminates grew, many new designs, such as those simulating tiles or heavy woven cloth, evolved. These designs must have appropriate color contrast and registry with the surface hill-to-valley configuration. The problem of registration of color and embossing proved very difficult to solve, not only from the standpoint of the appearance of the finished laminate but from the standpoint of the cost of the production of laminates having a substantially perfect registry of color and embossment. Embossed laminates have been successfully produced, however, and laminates of substantially registered color and embossment have also been prepared, see U.S. Pat. Nos. 4,091,198 and 4,092,199.

While the procedures disclosed in the above references have proven somewhat successful, the search for other methods for achieving registration of color and embossment has continued. In U.S. Pat. No. 4,093,766 there is disclosed a process whereby not only a registration of color and embossment is achieved but laminates having three different colors therein are disclosed.

The method disclosed in U.S. Pat. No. 4,093,766, while producing adequate laminates, functions by the flowing of pigment resins which are impregnated into paper sheets. Due to the difficulty of not only the impregnated resin but also the pigment particles to flow through the sheets during heat and pressure consolidation, the resultant laminates have not exhibited a degree of contrast of color which many desire.

SUMMARY

A novel three color high pressure laminate has now been uncovered. This laminate is more commercially significant than previously known laminates because it is more economical and obviates many of the disadvantages of the prior procedures. When utilizing the novel process hereof, there is no limit to dimension, design, depth of embossment or color which can be achieved. It avoids the mechanical registering of extraneous embossing media with decorative sheets in the laminates before or after pressing and the application of materials at press time.

According to the present invention a three color, decorative laminate having on its decorative surface, protrusions of any selected design, which protrusions are of two colors different from the background surface color of the laminate is provided.

THE DRAWING

Figure 2:
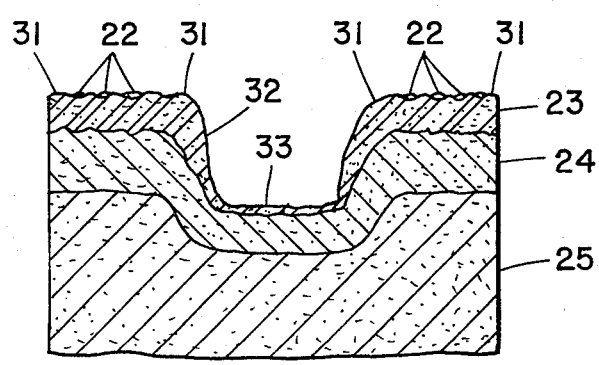

In the drawing:

FIG. 1 represents, schematically, the formation of a high pressure laminate assembly in accordance with the method of the present invention, and FIG. 2 is a schematic cross-section of a laminate section in accordance with the present invention.

DESCRIPTION OF THE INVENTION

The novel invention constitutes a laminate comprising
(1) a rigidity imparting substrate,
(2) a fibrous colored, background sheet impregnated with a first thermoset resin,
(3) a coating of a pigmented thermoset resin adjacent said (2) and
(4) a third color coating positioned atop said (3), and
(5) optionally, an overlay sheet positioned between said (3) and said (4).

The method of the present invention comprises,

A. assembling, in superimposed relationship, a laminate assembly comprising:
 (i) a rigidity imparting substrate,
 (ii) a fibrous background sheet impregnated with a thermosetting resin,
 (iii) a coating of a pigmented, flowable resin,
 (iv) a release sheet having an ink layer on the surface thereof adjacent to said decor sheet and
 (v) an embossing press plate having a surface with protuberant and valley areas capable of being impressed into at least said coating, B. heat and pressure consolidating said assembly so as to transfer said ink layer to the upper most surface of said coating, C. removing said release sheet and said embossing press plate from the resultant ink-surfaced embossed laminate, and D. recovering the resultant laminate.

The above method is more fully understood when considered in conjunction with the drawing hereof. More particularly, referring to FIG. 1, 20 represents an embossing press plate having a surface of protuberant and valley areas capable of being impressed into at least the coating adjacent the background sheet and, preferably, into said background sheet. The ink coated release sheet 21 is positioned below plate 20 with its ink coated release surface 22 facing away from plate 20. A background sheet 24 is positioned below release sheet 21. In the figure, the background sheet is shown having pigmented coating 23 upon its surface, although, as mentioned herein, the coating 23 can also be positioned elsewhere. A plurality of phenolic resin impregnated sheets 25 form the core of the resultant laminate, pressing plate die 26 forming the bottom of the laminate assembly.

In FIG. 2, the uppermost core sheet 25 only is shown below background sheet 24. Coating 23 can be seen after having flowed from the area of high pressure to that of lower pressure. The ink coating is shown released from the release sheet at 22, it having been deposited upon the surface of the coating 23. In the laminate of FIG. 2, the color of the background sheet will show on the laminate surface in the area represented by numeral 33, while the color of the coating 23 will show primarily in the area represented by numeral 31. The area represented by numeral 32 will have a color closely akin to the color of the coating 23 but somewhat subdued. When the transfer ink is a flowable ink, it will either blend with the coating 23 at 31 to create a color variation or will create a muted color at 32.

The fibrous core sheets used as the rigidity imparting substrate in preparing the high pressure laminates of the present invention are resin impregnated paper sheets and more preferably, kraft paper sheets. When such kraft paper sheets are used, it is preferred that they have a basis weight of between 40 lbs. (per 3000 sq. ft. ream) and 140 lb. and more preferably about 90 lbs. per ream.

The thermosetting resin used to impregnate such core sheets may be any suitable resin known for such use but phenol/formaldehyde resin is preferred. When using such a resin, it is preferred to impregnate and then dry the impregnated sheets, by methods known in the art, to a resin content of from about 25% to 45%, and more preferably to a resin content of about 30%, based on the weight of resin solids in the impregnated sheets. The volatile content of the dried impregnated sheet is preferably between 5% to 10%, more preferably about 8%, based on the total weight of the sheet.

The solid color decorative sheets are fibrous sheets and are also thermosetting resin impregnated and, more preferably are opaque, pigmented alphacellulose and may carry a printed design although the topmost Kraft sheet of the core can be used as a decorative sheet. When the preferred paper core sheets are employed, any suitable basis weight paper may be used to advantage, but papers of from 40 lbs. (per 3000 sq. ft. ream) to 120 lbs. (per 3000 sq. ft. ream) are generally preferred.

An alpha-cellulose paper may be used in the preparation of a thermosetting resin-impregnated overlay, if desired, to impart abrasion resistance to the laminate surface and may constitute any paper known for such use in the production of conventional decorative plastic laminates. Preferably, it is a wet strength alpha-cellulose paper having a basis weight of between 10 lbs. (per 3000 sq. ft. ream) and 40 lbs. and, more preferably, 25 lbs. (per 3000 sq. ft. ream). In its impregnated and cured condition, the overlay is substantially transparent. When an overlay sheet is employed, the transfer ink must be applied so as to only cover partial areas of the laminate surface unless the ink color is very subtle and not opaque because coverage of the entire surface with a dark or opaque ink will mask the color of the flowable, pigmented coating positioned above the substrate and thereby defeat the purpose thereof.

The thermosetting resins used to impregnate the decorative paper sheet and the overlay, if used, may be the same or different and may be any thermosetting resin suitable for such purpose. For example, melamine-formaldehyde resins, melamine-urea-formaldehyde resins, unsaturated polyester resins and the like may be employed. If different resins are used to impregnate the different layers, care should be taken to ensure that the resins are compatible, that is, the resins must be capable of forming strong coherent bonds with each other under the conditions used for consolidation and no deleterious reactions between the resins should occur. It is preferred to use only one type of resin for the purposes mentioned, and more preferably, to use a melamine-formaldehyde resin for these purposes.

Various plasticizers and/or other modifiers may be incorporated into the impregnating resins in order to obtain improved plastic flow properties during the curing of the material. Other modifiers may also be employed to improve release from press plates, workability and other properties of the amino plastic resins, as is known in the art.

The embossing press plates used in the instant invention can be prepared by etching or machining a design on a metal plate. Alternatively, and more preferably, the plate can be prepared as disclosed in U.S. Pat. No. 3,718,496, which patent is hereby incorporated by reference. Still further, the raised printed design technique, as taught by Grosheim in U.S. Pat. No. 3,373,068, will also work well as an embossing medium in the instant invention.

The materials useful as the pigmented coating in the laminates of this invention consist of any of the above-described viscous thermosettable resins i.e. liquid coating vehicles, or others known to those skilled in the art, prepared in either different colors, or shades of the same color or both depending upon the color of the fibrous, background sheet. Any of the above-described impregnating resins used to impregnate the decor and/or overlay sheets may be used to form the pigmented coating. The pigmented resinous coating may comprise the same resin used in impregnating the decor and/or overlay sheets or may be a different resin. The said pigmented coating is positioned above the substrate. By "above the substrate" is meant that the pigmented coating can be positioned anywhere above the substrate but not applied to the substrate before heat and pressure consolidation. The coating is, however preferably positioned above the decor sheet i.e. on the decor sheet surface or on the overlay bottom. It may be formed and positioned by coating either side of the decor sheet or the underside of the overlay sheet. More than one coating i.e. 2 or 3, may be used in one laminate. If more than one coating is used, they may be of the same or different color.

The resin used in preparing the pigmented resin coating is generally composed of the same basic material as used in impregnating the decorative and overlay sheet as discussed above. The resins are different to the extent, however, that they should contain varying amounts of thinners, solvents, fillers, etc. so as to vary their viscosities and thereby cause the pigmented coating to flow more than the other resin during the consolidation procedure.

The pigmented resin coating may be colored by the inclusion therein of any one of, or a combination of, inorganic or organic color pigments, extender pigments, metallic pigments etc. The amount of pigment added to the resin will vary from 0.5% to 20%, based on the total weight of the resin, and dependent upon the pigment used and resultant color contrast desired. Typical inorganic pigments useful include those iron pigments ranging in color from yellow through red, reddish-brown, brown to black. Such iron pigments include yellow ocher, raw and burnt sienna, and raw and burnt umber. Other useful inorganic color pigments include chrome yellow, cadmium sulfide, zinc yellow, cobalt blue, ultramarine blue, iron oxide, chrome green, chromium oxide green, chromium hydroxide green, lamp black, and white pigments such as titanium dioxide, titanium calcium, zinc oxide, zinc sulfide antimony oxide, lithopone, etc. Although lead pigments may be used, they are preferably avoided because of the safety hazard involved in their use. Organic pigments which may be used include toluidine red, phthalocyanine blue and green, Vandyke brown, alizarin, madder lake, lithol red, and the like.

Useful metallic pigments include aluminum powder, copper powder, bronze powders available in various shades depending upon the alloy composition, zinc powder, gold and gold-like powders, and the like. Any of the pigments, and particularly the metallic pigments, may be used alone or in combination with each other or in combination with other pigments. Furthermore, both resins may be pigmented as long as the colors employed are different and one flows more than the other, as discussed herein.

The pigmented thermosetting resin coating, in either a color or shade different from the decorative background sheet, is provided in the laminate assembly by applying it, as a coating of from 0.5 gram/sq. ft. to 20 grams/sq. ft., to one or more surfaces of the decorative sheet or the overlay sheet while they are in web form. The impregnated and coated webs, after drying are then cut to the desired size before being incorporated into the laminate assembly. The surface of the sheet or sheets to which the coating is applied is so chosen that in the finished laminate the colored coating formed by the coating operation preferably lies between the decorative and overlay sheets although other positioning of them is possible.

The impregnating and coating processes are preferably carried out as two separate operations during which the web is first impregnated with the first thermosetting resin composition and then the pigmented, second resin layer composition is applied and subsequently dried. Alternatively, the first thermosetting resin may be applied to the background or overlay sheet to impregnate it therewith and the coating of the pigmented resin can be applied, such as by knife coating, after the impregnated resin is dried. Also, the pigmented coating may be applied first, dried or not dried, and the resultant sheet can then be impregnated with the other resin.

The impregnation of the decorative and overlay webs is carried out using any of the above resin varnishes known for such use. For example, when employing the preferred melamine-formaldehyde resin compositions, satisfactory laminates are produced when the resin composition is applied in the form of an approximately 50% resin solids content varnish in a mixed alcohol-water solvent. When impregnating the decorative background sheet, the amount of resin applied is preferably from 25% to 40%, based on the weight of resin solids in the impregnated web after drying to a volatile content of between 2% and 6%, and preferably about 4%. When impregnating the overlay paper, the amount of resin applied is preferably from 50% to 70%, and more preferably from 55% to 60%, based on the weight of resin solids in the impregnated paper after drying to a volatile content of from 3% to 8%, and preferably from 4.5% to 6.5%. Webs prepared having these resin and volatile contents may be cut into sheets that possess the necessary characteristics for good bonding to take place in the subsequent heat-pressing operation during which the resin becomes substantially fully cured.

When the laminates of this invention are prepared by coating an impregnated decor or overlay sheet, the coating composition employed should be of such a nature and consistency that it may be satisfactorily applied to the impregnated webs in a uniform and controlled manner by the apparatus used. Any suitable method for applying the coating may be used such as by using a reverse roll coater, a gravure cylinder, an air knife, a sprayer or a brush.

Flow promotors which can be added to the resin to be coated in order to cause it to flow more than the other resin include ethylene glycol, phenyl ether, and the like. Amounts of flow promotor ranging from about 0%–10%, by weight, based on the weight of the resin to which it is added, may be used. Best results have been achieved using a pigmented resin which flows more than the resin which is impregnated into the background sheet. However, if both resins are pigmented, either one may possess the required greater flowability. The flow rate of the resin selected to form the pigmented coating can, of course, be such that the pigmented resin inherently flows more than the first impregnated resin, and, in such cases, no flow promotor need be used.

Any release sheet or separator sheet known in the art to be useful in the production of decorative laminates to prevent the adherence of the press plate to the uppermost surface of the laminate may be used herein. Any non-adherable paper or non-adherable aluminum or other metal foil may be used. These materials are all commercially available and include papers coated, treated or impregnated with polypropylene, fluorocarbon resins and the like. Films of polypropylene may also be used. Papers coated with sodium alginate or other salts of alginic acid, silicone resin treated papers, silicone oil treated papers, "Quillon" treated papers, wax coated papers, glassine, aluminum coated paper and the like may also be used. Other useful release sheets include those disclosed and claimed as U.S. Pat. Nos. 4,117,198 and 4,118,541 which comprise paper sheets coated with a mixture of, or separate individual coatings of, (1) an oil-modified alkyd resin cross-linked with a polyalkylether of a polymethol melamine and (2) a copolymer of a maleic acid, ester or anhydride with a vinyl ether or unsaturated alkyl comonomer, said patents hereby being incorporated herein by reference.

The inks used in the present invention are generally those which are capable of being not only easily applied to the surface of the release sheet but capable of transferring from the release sheet to the surface of the pigmented coating, background sheet or overlay sheet of the resultant laminate. Inks which, after being transferred to the laminate surface, are resistant to removal by wear and abrasion, etc. are particularly advantageous. Useful inks include gravure inks, etc. Those inks based on amino resins, preferably melamine/formaldehyde resin are particularly preferred. These inks are described, for example, in U.S. Pat. No. 3,814,647 at Column 4, lines 30–75, which patent is hereby incorporated herein by reference. The inks may, preferably, also be flowable to the extent that, upon heat and pressure consolidation, they flow into the surface of the pigmented coating, if it is atop the background sheet, thereby creating even more pleasing effects and providing increased abrasion resistance. When the transferred ink is flowable, it flows to the low pressure areas of the laminate surface, or blends with the pigmented resin in the areas adjacent the low pressure areas and is not found appreciably in the high pressure areas. A subtle color is thereby created at the medium pressure areas of the laminate surface. When the ink does not flow, it remains where it is transferred from the release sheet onto the laminate surface.

The ink layer or coating comprising the third basic color of the instant laminates may be applied to the surface of the release sheet in a uniform and controlled manner by any suitable method known in the art. Reverse roll coating, gravure cylinder printing, air knife coating, spraying or applying by brush all contribute satisfactory means for applying the ink.

The ink layer may be of the same color or a different color than that of the pigmented coating and/or the background sheet per se or the design or pattern printed on the background sheet. Normally, the entire surface of the release sheet is coated with the ink layer, however, it is also within the scope of the present invention to apply the ink layer to the release sheet surface in any pattern, design, configuration, etc. desired.

Burnishing of the laminate after it is removed from the laminating press can be accomplished, if desired, by the use of methods known in the art for dulling laminate surfaces. Burnishing machines wherein the laminate surface is softly contacted with such abrasive materials as steelwool, pumice, etc. may be used. The burnishing step removes the ink from the highest portions of the embossed laminate surface revealing the color and pattern of the pigmented coating and/or background sheet while the ink remains on the intermediate or lower areas of the embossed laminate surface thereby somewhat obscuring or muting the color and/or pattern of the background sheet.

The result is an aesthetically pleasing laminate surface of registered color and embossment. The embossments in the laminate surface should preferably be at least about 0.007 inch in depth although depths of less than 0.007 inch also result in attractive laminates.

The embossed areas of the resultant laminate, i.e. those formed from the protuberances of the embossing plate and forming the valleys of the final embossment in the finished laminate surface should preferably be at least 0.007 inch deep. Depths of less than 0.007 inch are possible but not preferred because the color contrast is not as evident. Laminates of muted color differentials can be produced using embossments of these lesser depths however.

The following examples are set forth for purposes of illustration only and are not to be construed as limitations on the present invention except as set forth in the appended claims. All parts and percentages are by weight unless otherwise specified.

EXAMPLE 1

A 115 lb. saturating Kraft paper sheet is impregnated with a phenolic resin to 28% pickup and 2% flow bleed. This saturated kraft is then knife coated 0.012 inch (wet coat) with the following resin; 10% polyvinyl alcohol in melamine/formaldehyde resin, that is colored with Blue colorant AIB-113, at 1% of total weight and contains 5% ethylene glycol phenyl ether and 0.1% surfactant. The sheet is then dried in an oven 6 minutes at 110° C. A release paper using a chrome complex release media as the release agent is coated with the following resin ink, at 0.001" thick wet coat. Melamine/formaldehyde resin which is thickened with carboxylated methyl cellulose and colored with 1% titanium dioxide and also contains 5% ethylene glycol phenyl ether and 0.5% surfactant. This sheet is dried in an oven 4 minutes at 110° C. The two sheets are assembled in a buildup as follows:

Iron
5-Cushion sheets
S.S. Plate
Tile textured phenolic master press plate
Coated release sheet (coating away from press plate)
Coated phenolic/kraft (coating toward release sheet)
6-Phenolic/kraft core sheets
Aluminum release sheets
S.S. Plate
5-Cushion sheets
Iron This laminate assembly is placed in a consolidating press at 700 psi and 142° C. for 40 minutes. On removal from the press and inspection of the laminate, it is found to have a 4" tile texture, blue in color with a pleasing white spattering over the tile. It also has a black colored grout line from the phenolic Kraft sheet.

EXAMPLE 2

Example 1 is repeated except the melamine/formaldehyde resin on the release sheet is thickened with high viscosity sodium alginate. This laminate has good texture with black grout lines. The thickened melamine creates a white streaking in the blue coloring of the tile areas because it does not flow appreciably.

EXAMPLE 3

Example 1 is repeated except the coating on the phenolic/kraft is a melamine/formaldehyde thickened with high viscosity sodium alginate. This laminate has good texture with black grout lines.

EXAMPLE 4

Example 1 is repeated in all essential details except that a solid red alpha cellulose background sheet is used in place of the topmost kraft. The blue coating is positioned on top of the alpha cellulose background sheet.

The resultant laminate has red grout lines with blue tiling containing white spattering.

EXAMPLE 5

Example 4 is repeated in all essential details except that a 26 lb./3000 sq. ft. alpha-cellulose overlay sheet is impregnated with clear melamine/formaldehyde resin and dried. The resultant overlay, which contains a resin content of 65%, is then interposed between the blue pigmented coated decor surface and a partially ink coated release sheet. After the pressing, the result is analogous to that of Example 4.

EXAMPLE 6

Example 5 is repeated in all essential details except that instead of the background sheet being coated with the pigmented coating, the same coating is applied to the underside of the dried impregnated overlay. In assembling the materials for pressing, the overlay is placed over the background sheet with the blue coated side of the overlay in an adjacent relationship with the background sheet surface. After the pressing, the laminate is examined and found comparable to that of Example 4.

EXAMPLE 7

Example 1 is repeated in all essential details except the dried coating weight applied to the Kraft background sheet is 3 qms./sq.ft. After the pressing, the laminate is examined and has good color contrast.

EXAMPLE 8

Example 4 is repeated in all essential details except that the Kraft background sheet is coated with a solution containing ¼% of a brown iron oxide pigment and 1% of ethylene glycol phenyl ether. The press plate used carries a leather texture design. After pressing, the laminate is recovered and examined. The valley area is red whereas the raised part of the design is dark brown with white spatterings.

EXAMPLE A

To 92.5 parts of an alkyd resin solution produced from 39.7 parts of soya oil, 41.3 parts of isophthalic acid and 19.0 parts of glycerol and having a solids content of about 62%, a viscosity of 23-29 secs. No. 2 Zohn cap 77.0° F. and a density of 8.4-8.7 lbs/gal. in a 67/33 isopropanol/xylene solvent and containing 50% of hexakismethoxymethyl-melamine are added 7.5 parts of a catalyst solution comprising 50% p-toluene sulfonic acid and 50% isopropanol and 5.0 parts of a 40% solution to toluene of an alkyl vinyl ether/maleic anhydride copolymer in which the alkyl vinyl ether mixture (96% $C_{18}$ alkyl, 2% $C_{16}$ alkyl and 2% $C_{10-14}$ alkyl vinyl ethers) is copolymerized with an equimolar amount of maleic anhydride. The complete solution is applied to a 35 lb/300 ft. ream, blocked Kraft grease-proof paper of 0.2 mil thickness by means of a gravure printing cylinder. The coated paper is then dried and cross-linked in a hot air oven for 30 seconds at 280° F.

The resultant, dried, release sheeting is then contacted on its coated surface with a black gravure ink using a 150 line printing cylinder, dried and cut into four foot by eight foot sections.

EXAMPLE 9

An assembly is prepared preparatory to insertion into a laminating press of the following components, reading top to bottom;
1. A lace pattern embossed press plate with its embossing surface facing downwardly,
2. A section of the ink-coated release sheet prepared in Example A above, with its ink-coated surface facing downwardly,
3. A melamine-formaldehyde resin impregnated, α-cellulose overlay sheet,
4. A melamine-formaldehyde resin impregnated α-cellulose tan decor sheet having a coating therein of a flowable, red melamine/formaldehyde resin.
5. Eight sheets of phenolic resin impregnated Kraft sheets and
6. A pressing plate die.

The assembly is placed in a laminating press and, after the pressing cycle is complete, it is removed and separated at the junction of the release sheet and overlay sheet. A decorative laminate is recovered having its deepest embossment of a tan to brown color and its raised surface of a red color with intersperced black blotches thereon.

EXAMPLE 10

The procedure of Example 9 is again followed except that the overlay sheet is omitted from the laminate assembly. Again an attractive laminate is produced.

EXAMPLE 11

The procedure of Example 10 is again followed except that the black gravure ink is coated onto the metal side of an aluminum caul sheet (aluminum foil coated paper) and the ink is thickened by adding lecithin. The black ink transfers to the laminate surface and flows into the red coating creating a decorative laminate of an unusually pleasing appearance.

EXAMPLE 12

The procedure of Example 9 is again carried out except that wax-coated paper is used as the release sheet which is coated with the black gravure ink. A laminate substantially identical to that of Example 9 is recovered.

EXAMPLE 13

The procedure of Example 9 is again followed except that the black gravure ink is replaced by a dark brown ink composed of 73% of a 50% solid solution of a methylol melamine resin, 23% of pigment, 3.6% of silica and 0.4% of non-ionic surfactant. Similar results are obtained.

EXAMPLE 14

Again the procedure of Example 9 is employed except that the ink is composed of 67% of methylol melamine resin solution (50% solids), 29% $TiO_2$, 0.5% carbon pigment, 3% silica and 0.5% non-ionic surfactant. Again, a laminate having an excellent aesthetic appearance is produced.

EXAMPLE 15

Following the procedure of Example 10 except that the ink formulation comprises an aqueous isopropyl alcohol solution containing 25% polyvinyl alcohol to which is added carbon black. A laminate having an aesthetically pleasing surface results.

EXAMPLE 16

Again following the procedure of Example 9 except that the ink is a 10% dioxane solution of ethyl cellulose (48% ethoxy) containing blue pigment and the release sheet upon which the ink is printed is a "Quillon" treated paper, excellent results are achieved.

I claim:

1. A method of producing a multicolored decorative laminate having registered color and embossment comprising:
   A. assembling, in superimposed relationship, a laminate assembly comprising:
      (I) a rigidity-imparting substrate,
      (II) a resin impregnated fibrous background sheet,
      (III) a coating of a flowable, pigmented resin,
      (IV) a release sheet having an ink layer on the surface thereof adjacent to said background sheet, said ink being flowable during heat and pressure consolidation and (V) an embossing press plate having a surface with protuberant and valley areas capable of being impressed into at least said release sheet,
   B. heat and pressure consolidating said assembly so as to transfer said ink layer to the surface of said coating, and cause flow of the transferred ink and said coating from the areas of high pressure to the areas of low pressure,
   C. removing said release sheet and said embossing press plate from the ink-surfaced, embossed laminate and
   D. recovering the resultant laminate.

2. The method according to claim 1 wherein said substrate comprises a plurality of phenol/formaldehyde resin impregnated cellulosic sheets.

3. The method according to claim 1 wherein there is positioned between said background sheet and said release sheet, a resin-impregnated overlay sheet and said ink is transferred to the upper layer of said overlay sheet.

4. The method according to claim 1 wherein said substrate comprises a plurality of phenol/formaldehyde resin impregnated cellulosic sheets.

5. A method according to claim 1 wherein said ink flows under the conditions of heat and pressure consolidation at a rate less than that of said coating.

6. A heat and pressure consolidated laminate of registered embossment and color contrast comprising, in superimposed relationship,
   (1) a rigidity-imparting substrate,
   (2) a fibrous, background sheet impregnated with a first thermoset melamine/formaldehyde resin,
   (3) a coating of a pigmented, second thermoset melamine/formaldehyde resin positioned above said (2) and
   (4) an ink having a color different from said (2) and (3) positioned above said (3), the surface of said laminate containing an embossment consisting of protuberances and valleys each of which are of a different color, the color of said (2) being primarily evidenced at the valleys thereof, the color of said second resin being evidenced at the lower areas of said protuberances and said ink being primarily evidenced at the higher areas of said protuberances.

7. A laminate according to claim 6 wherein said substrate comprises a plurality of phenol/formaldehyde resin impregnated sheets.

8. A laminate according to claim 6 wherein there is positioned between said (3) and said (4), a resin impregnated overlay sheet.

* * * * *